US010450406B2

(12) United States Patent
Alamri et al.

(10) Patent No.: US 10,450,406 B2
(45) Date of Patent: Oct. 22, 2019

(54) FLUORINATED POLYIMIDE-BASED EPOXY MATERIALS (71) Applicant: Saudi Arabian Oil Company, Dhahran (SA)

(72) Inventors: Haleema Abdulrahman Alamri, Alkhobar (SA); Aziz Fihri, Paris (FR); Gasan Selman Alabedi, Cheadle (GB); Abdullah Ayedh Al-Shahrani, Dammam (SA); Ihsan Al-Taie, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 156 days.

(21) Appl. No.: 15/691,267

(22) Filed: Aug. 30, 2017

(65) Prior Publication Data
US 2019/0062492 A1 Feb. 28, 2019

(51) Int. Cl.
*C08G 59/50* (2006.01)
*C08G 59/40* (2006.01)
*C08G 73/02* (2006.01)
*C08G 73/10* (2006.01)

(52) U.S. Cl.
CPC ....... *C08G 59/506* (2013.01); *C08G 59/4042* (2013.01); *C08G 59/504* (2013.01); *C08G 59/5033* (2013.01); *C08G 73/024* (2013.01); *C08G 73/026* (2013.01); *C08G 73/1039* (2013.01); *C08G 73/1071* (2013.01)

(58) Field of Classification Search
None
See application file for complete search history.

(56) References Cited

U.S. PATENT DOCUMENTS

| 4,244,857 A * | 1/1981 | Serafini | C07D 209/48 523/468 |
| 5,637,772 A | 6/1997 | Malik et al. | |
| 5,709,947 A * | 1/1998 | Hodgkin | C07D 209/48 428/413 |
| 9,480,954 B2 | 11/2016 | Liu et al. | |
| 2002/0022310 A1 | 2/2002 | Han et al. | |

FOREIGN PATENT DOCUMENTS

EP 0230112 A2 7/1987

OTHER PUBLICATIONS

Vaishnav Kiran et al: "Curing and thermal behavior of epoxy resins of hexafluoro-bisphenol-A and bisphenol-A", Polimeros: Ciencia Y Tecnologia, vol. 26, No. 1, Mar. 15, 2016, pp. 11-20.

* cited by examiner

*Primary Examiner* — Michael J Feely
(74) *Attorney, Agent, or Firm* — Leason Ellis LLP (57) ABSTRACT

A curing agent for curing an epoxy resin comprises a fluorinated central moiety covalently bonded to first and second imide-amine moieties, the first and second imide-amine moieties include amine terminal functional groups, wherein the amine functional groups of the curing agent, when applied to the epoxy resin, take part in curing reactions with ring molecules of the epoxy resin.

7 Claims, 8 Drawing Sheets

FLUORINATED POLYIMIDE-BASED EPOXY MATERIALS

FIELD OF THE INVENTION

The present invention relates to aromatic and fluorinated curing agents for epoxy resins which provide enhanced hydrophobic properties.

BACKGROUND OF THE INVENTION

Cross-linked epoxy resins are polymeric networks used extensively in a variety of applications such as adhesives and coatings. An epoxy network is formed through the mechanism of cross-linking two different moieties, an epoxy matrix and a hardener that causes cross-links to form in the matrix. Chemical reactions that take place between these two moieties create a strong network and significantly alter physical properties of the epoxy matrix. A variety of hardeners (cross-linkers) and additives can be used to further modify the properties of the epoxy upon curing.

In general, epoxy materials are most widely used for the protection of steel against corrosion. Epoxy materials have superior barrier properties and a high degree of adhesive strength that renders them extremely corrosion-resistant. However, the permeability of epoxy materials to water, oxygen, and electrolytes affects the performance of the epoxy coating, resulting in the deterioration of the coating and the subsequent corrosion of the underlying steel. Moisture resistance can be introduced into the epoxy matrix in a number of ways, with hydrophobicity enhancement being by far the most common method. Conventional techniques involve the incorporation of hydrophobic additives to the polymer matrix in order to enhance the overall hydrophobicity of the epoxy resin. Although this method has been reported to be very effective with respect to increasing the overall hydrophobicity of the materials, some non-homogeneity is still introduced into the matrix due to the discrepancies between the additive and the epoxy matrix.

What is therefore needed is an epoxy resin composition that has enhanced hydrophobicity, is homogeneous, and has suitable thermal resistance and stability.

SUMMARY OF THE INVENTION

According to embodiments of the present invention, a curing agent composition for curing an epoxy resin is provided. The curing agent comprises a fluorinated central moiety covalently bonded to first and second imide-amine moieties, the first and second imide-amine moieties include amine terminal functional groups. The amine functional groups of the curing agent, when applied to the epoxy resin, take part in curing reactions with ring molecules of the epoxy resin. The curing agent preferably has a molecular weight of less than 2000 grams per mole.

In some embodiments, the curing agent of the present invention has the following chemical formula:

In other embodiments, the curing agent of the present invention has the following chemical formula:

Embodiments of the present invention also provide a cured epoxy matrix comprising an epoxy resin and a curing agent composition cross-linked with the epoxy resin. The curing agent includes a fluorinated central moiety covalently bonded to first and second imide-amine moieties, the first and second imide-amine moieties include amine terminal functional groups. The amine functional groups of the curing agent, when applied to the epoxy resin, take part in curing reactions with ring molecules of the epoxy resin. In preferred embodiments, the curing agent is homogenously cross-linked with the epoxy resin throughout the matrix. It is also preferred that the curing agent have a molecular weight of less than 2000 grams per mole.

Any combinations of the various embodiments and implementations disclosed herein can be used.

These and other aspects, features, and advantages can be appreciated from the following description of certain embodiments of the invention and the accompanying drawing figures and claims.

BRIEF DESCRIPTION OF THE DRAWINGS

It is noted that the drawings are illustrative and not necessarily to scale.

DETAILED DESCRIPTION CERTAIN OF EMBODIMENTS OF THE INVENTION

A class of aromatic and fluorinated curing agents for epoxy resins suitable for use in anti-corrosion coatings as well as a process for producing the curing agents is provided. The curing agents include i) chemical moieties that can enhance the hydrophobicity of the coating so that water molecules are repelled and prevented from diffusing through the coating, thus slowing the corrosion process, and ii) an imide-amine functionality that enhances the mechanical and thermal stability of the epoxy coating. The improved hydrophobic properties of the coatings made using the curing agents disclosed herein are evidenced by an increased water contact angle of the coatings.

The term "epoxy resin" as used herein refers to any resins based on epoxides, which are organic compounds based on a functional group including an oxygen atom bound to two carbon atoms, which are in turn bound together. Examples of such epoxy resins include novolak, biphenyl, triphenol alkane, heteroglycidic, bisphenol A (e.g., DGEBA), bisphenol F and naphthalene ring epoxy resins.

The curing agents of the present invention include a fluorinated central moiety covalently bonded to first and second imide-amine moieties. The first and second imide-amine moieties include amine functional groups.

The curing agent preferably is a small molecule having a molecular weight of less than 2000 grams per mole.

One embodiment of the inventive curing agent has the following chemical formula (hereinafter "curing agent A"):

(1)

In the formula above, the central carbon is coupled to two $CF_3$ groups and to two aromatic rings. The aromatic rings are in turn coupled to imide groups. The imide groups (having a nitrogen atom coupled to two carbon atoms which are in term coupled to oxygen atoms by double covalent bonds) are each coupled to aromatic moieties (including two aromatic rings) having terminating amine ($NH_2$) groups. Accordingly, the central portion has exposed fluorinated functional groups while the side moieties have exposed amine functional groups.

Another embodiment of the inventive curing agent has the following chemical formula (hereinafter "curing agent B"):

(2)

As in formula (1) above, in chemical formula (2) the central carbon is coupled to two $CF_3$ groups and to two aromatic rings. The aromatic rings are in turn coupled to imide groups. The imide groups are each coupled to aromatic moieties (including four aromatic rings) having terminating amine ($NH_2$) groups. Accordingly, the central portion has exposed fluorinated functional groups while the side moieties have exposed amine functional groups.

Figure 1:
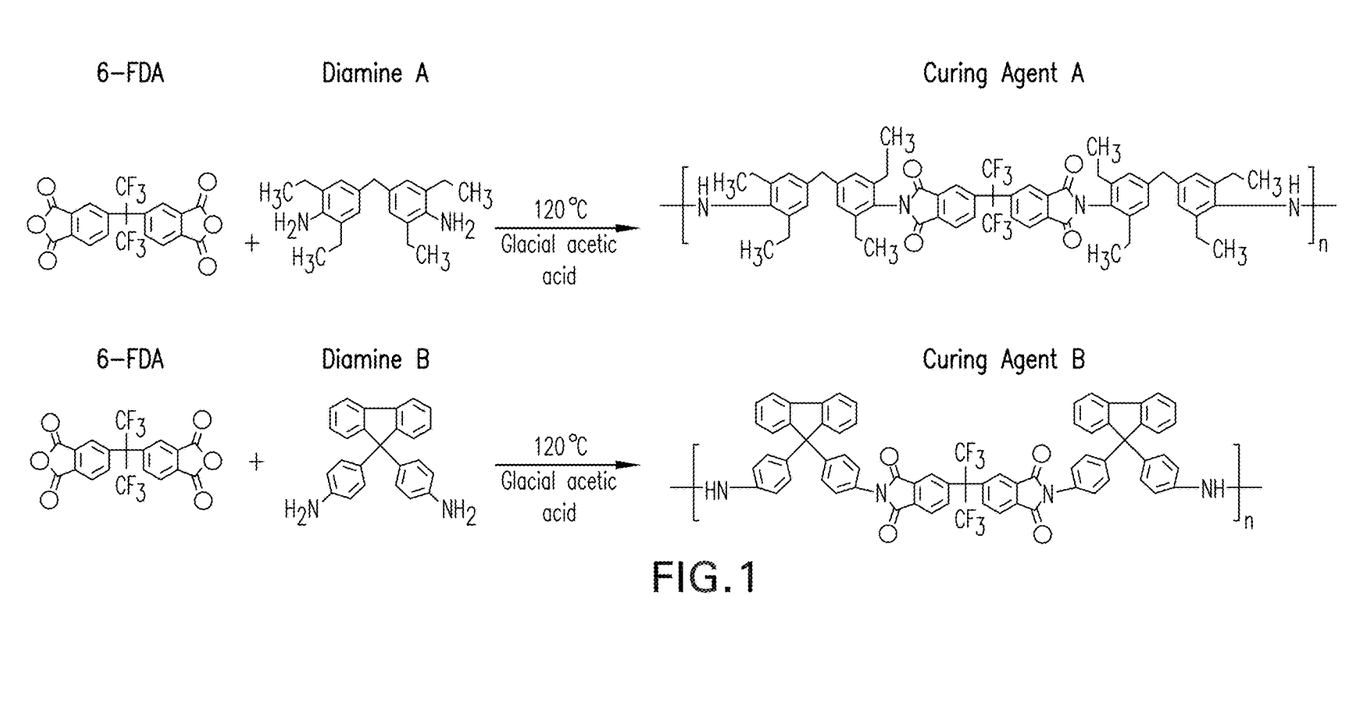
FIG. 1 is a schematic illustration of a method of producing curing agents A and B according to an embodiment of the present invention.

An exemplary method of producing the curing agents according to the present invention is disclosed as follows. The method is illustrated schematically in FIG. 1, which depicts the reactants on the left and the products on the right. In the first reaction, for producing curing agent A, 6-FDA (4,4'-(Hexafluoroisopropylidene) diphthalic anhydride) reacts with the diamine 4-4' methylene bis 2,8'-diethylaniline (diamine A). In the second reaction, for producing curing agent B, 6-FDA reacts with the diamine 4,4'-(8-fluorenylidene)dianiline (diamine B).

In a first step of the production method, 10 mmol of the respective diamine (A or B) is dissolved in 70 ml of glacial acetic acid in a round-bottom flask equipped with a condenser. To this mixture, 5 mmol of 6FDA (4,4'-(Hexafluoroisopropylidene) diphthalic anhydride) is added. The reaction mixture is then heated to 120° C. for 7 hours and the mixture is stirred. The final product is precipitated using ice water, filtered, and washed again several times with distilled water. A solution of sodium bicarbonate is next introduced in order to adjust the pH of the solution, which is then washed again using distilled water. In the final step, the product is allowed to dry overnight in a vacuum oven at 60° C.

To test the curing agents, both curing agents A and B were used in separate processes for the curing of diglycidyl ether of bisphenol-A (DGEBA), a type of epoxy resin. An exemplary curing process employs the following procedure. Freshly prepared imide-diamine curing agent (with mass of 1 gm) is added to 2 mL of tetrahydrofuran (THF) and stirred until completely dissolved. The solution is then poured into 4 gm of DGEBA dissolved in 5 ml of THF. The two solutions are then mixed together until the sample is completely homogeneous. The THF is then evaporated in a vacuum oven at 40° C. for 30 minutes. The resulting viscous solution can then be used for casting on a steel metal coupon and heated in an oven at 150° C. for 7 hours.

Analysis of the Curing Agents

X-ray diffraction is one technique that is often used for analyzing crystalline materials and polymers and offers information about the degree of polymerization of the polymers. It is well known in that art that polyimide is semi-crystalline, meaning that X-ray diffraction analysis of polyimide typically reveals a diffraction pattern. Curing agents that are semi-crystalline exhibit a regular diffraction pattern when the degree of polymerization is high. However, if only small molecules or oligomers are present, the analysis tends to show an irregular, indistinct diffraction pattern.

Figure 2:
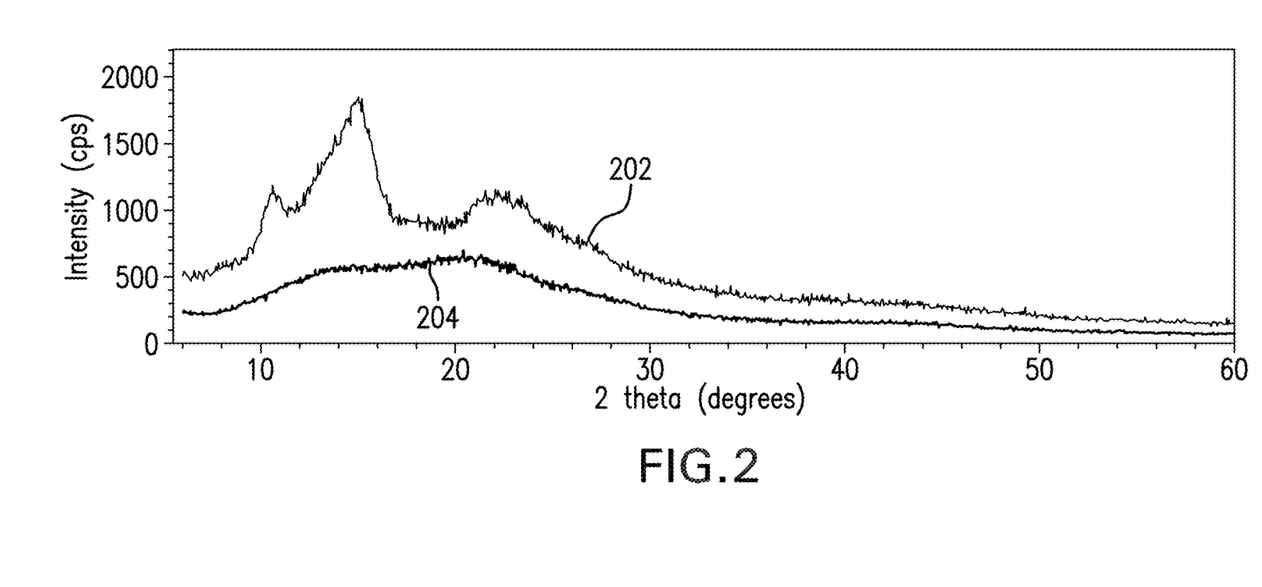
FIG. 2 shows results of an X-ray diffraction analysis of curing agents A and B.

An example of such an irregular pattern is shown in FIG. 2, which shows X-ray diffraction patterns obtained for both curing agents A and B. The top curve 202 in FIG. 2 shows the X-ray diffraction pattern of curing agent A, while the bottom curve 204 in FIG. 2 shows the X-ray diffraction pattern of curing agent B. In the curve 202 for curing agent A, the pattern is somewhat more accentuated and distinct, which can be attributed to the polyimide moiety having a relatively higher molecular weight than in curing agent B. The curve 204 for curing agent B is relatively indistinct, showing a broad elevated region, which indicates that curing agent B contains amorphous oligomers. As both curing agents in the example were synthesized under identical conditions, the X-ray diffraction data can be interpreted as a function of the reactivity of the respective diamines used in the synthesis of curing agents A and B. Diamine B used in producing curing agent B, which contains a pendant fluorenyl moiety group, exhibits less reactivity with respect to the amine interacting with anhydrides and thus forms only oligomers. In contrast, diamine A, which includes the electron-donating methyl groups, shows more reactivity with respect to the anhydride, resulting in a poly-condensation reaction that yields a pre-polymer. The semi-crystalline character of pre-polymer groups is indicated by the distinct peaks in curve 202 of curing agent A.

Figure 3:
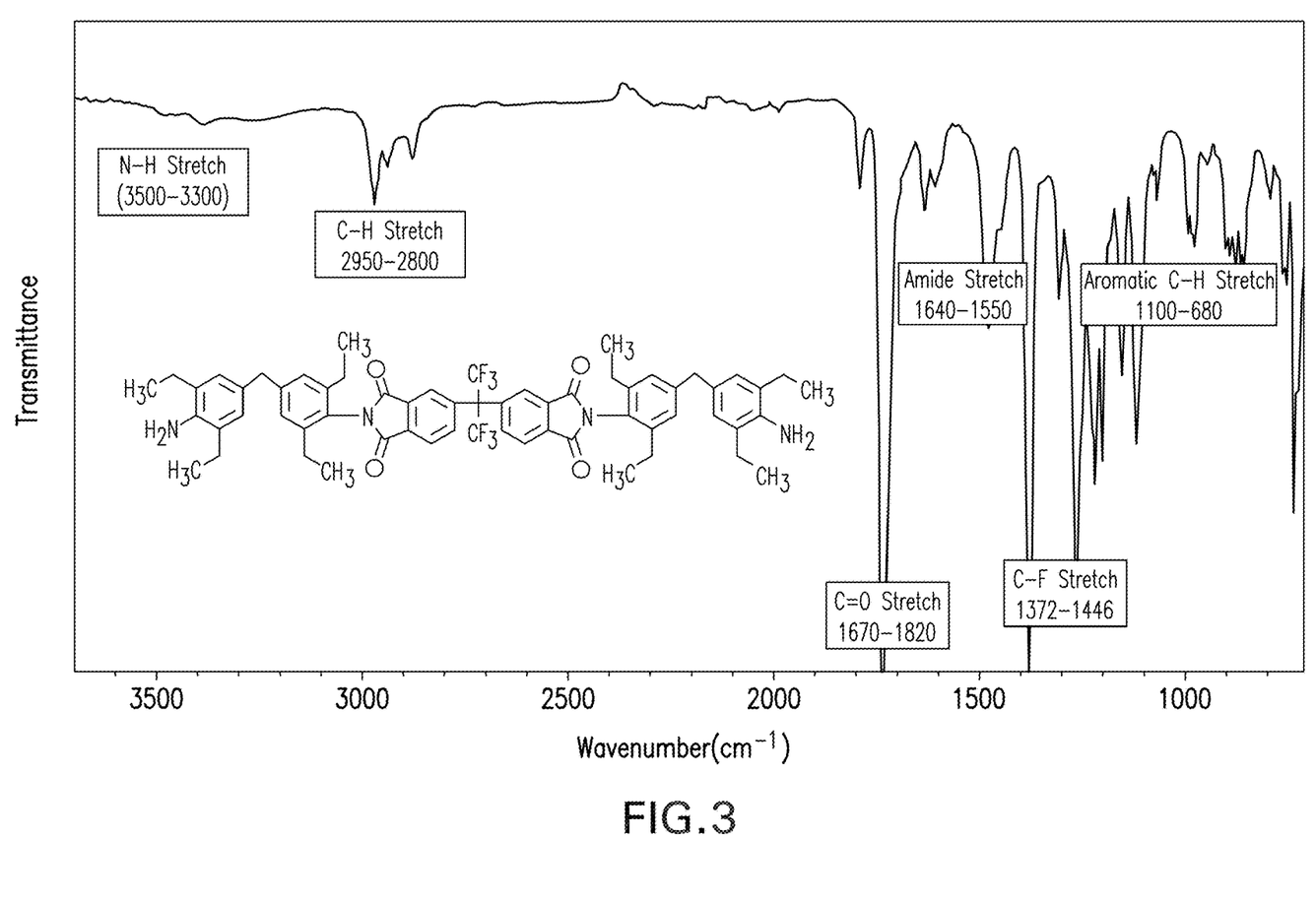
FIG. 3 shows results of a Fourier-transform infrared spectrum (FTIR) analysis of curing agent A.
Figure 4:
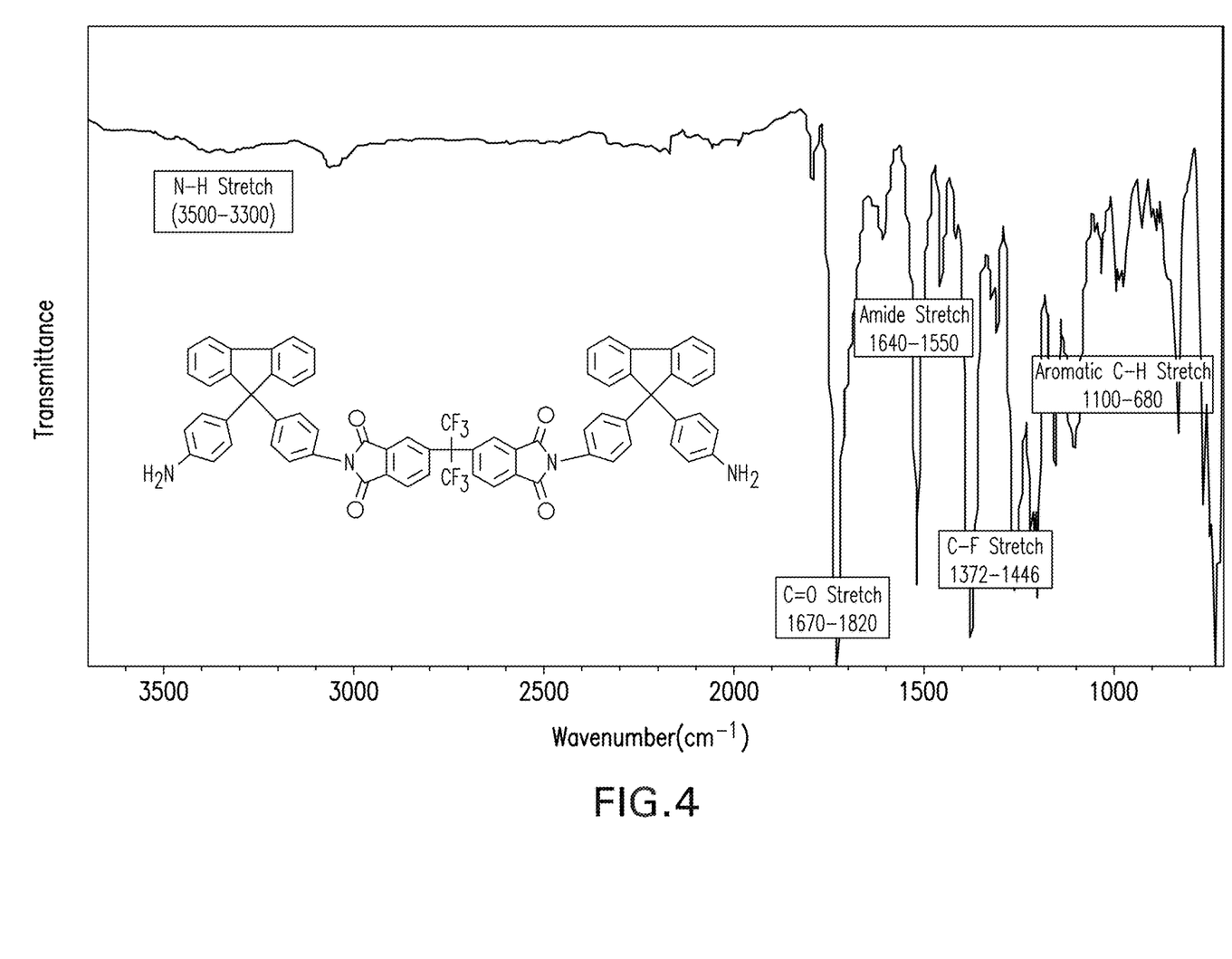
FIG. 4 shows results of a Fourier-transform infrared spectrum (FTIR) analysis of curing agent B.

The curing agents were also analyzed using Fourier-transform infrared spectroscopic (FTIR) techniques. FTIR spectroscopic data were collected for the samples using a Varian FTIR spectrophotometer equipped with a mercury cadmium telluride detector and a Golden Gate accessory based on an average of 128 scans at a resolution of 4 per centimeter. An FTIR spectrum of curing agent A is shown in FIG. 3 and an FTIR spectrum of curing agent B is shown in FIG. 4. The y-axis of FIGS. 3 and 4 indicates transmittance and x-axis indicates inverse of distance ($cm^{-1}$). FTIR spectra generally display peaks that represent stretching and/or vibration signatures of specific molecular bonds. The spectra in FIGS. 3 and 4 show vibration frequency peaks (with respect to the x-axis) at 3472, 3375, 3247 (which represents N—H stretching), 1784 (which represents imide-carbonyl symmetric stretching), 1721 (imide carbonyl asymmetric stretching), 1373 (imide-C—N), 1600 (C=O stretching), and 1511 (N—H bending vibration). An out-of-plane bending vibration also appears at around 820 $cm^{-1}$ and 916 $cm^{-1}$ for the NH groups. These results confirm the successful synthesis of the targeted compounds as evidenced by the appearance of all of the characteristic peaks of the corresponding stretching bands for each of the functional groups of the synthesized curing agents.

Figure 5:
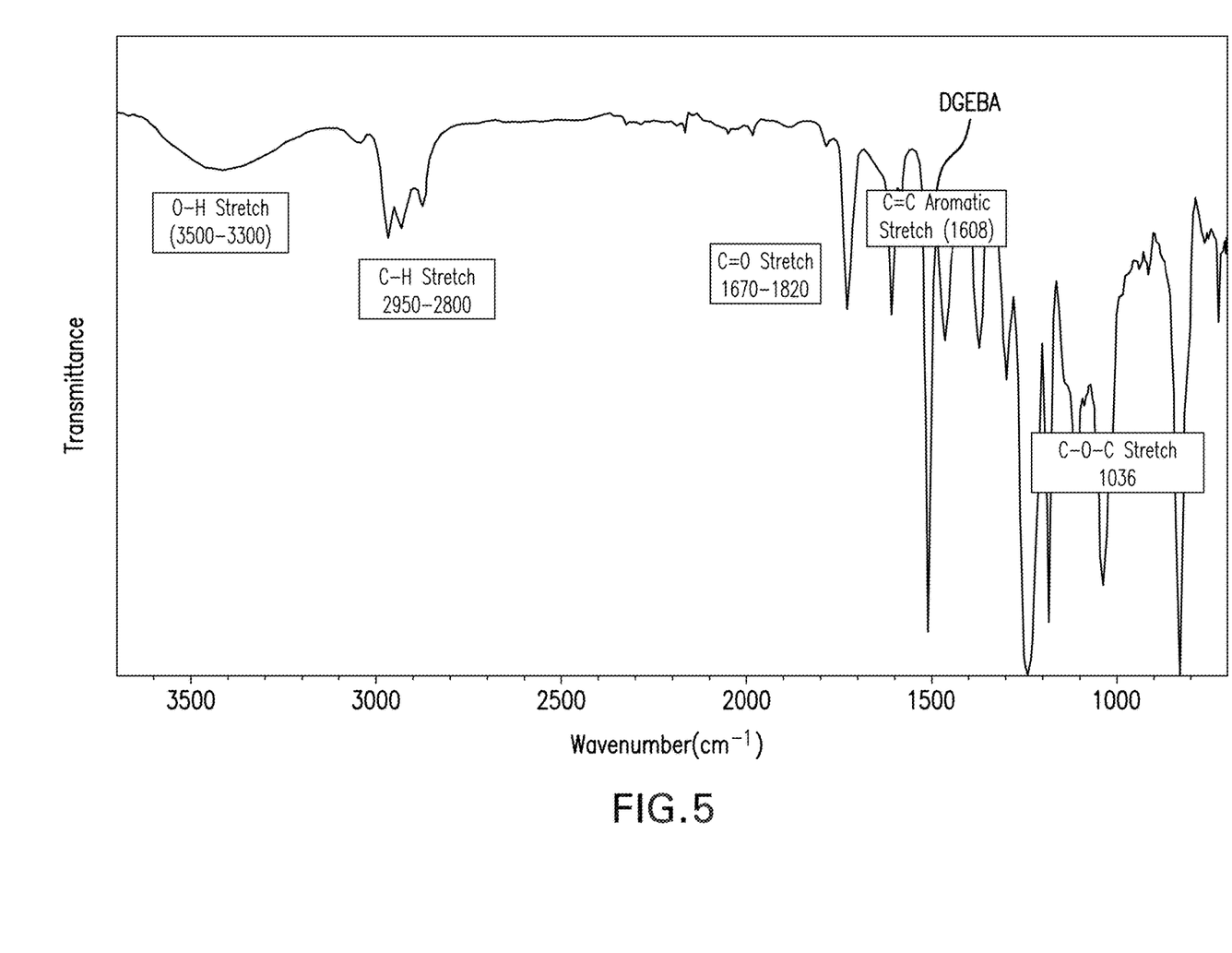
FIG. 5 shows results of a Fourier-transform infrared spectrum (FTIR) analysis of a bisphenol-A (DGEBA) epoxy cured with curing agent A.
Figure 6:
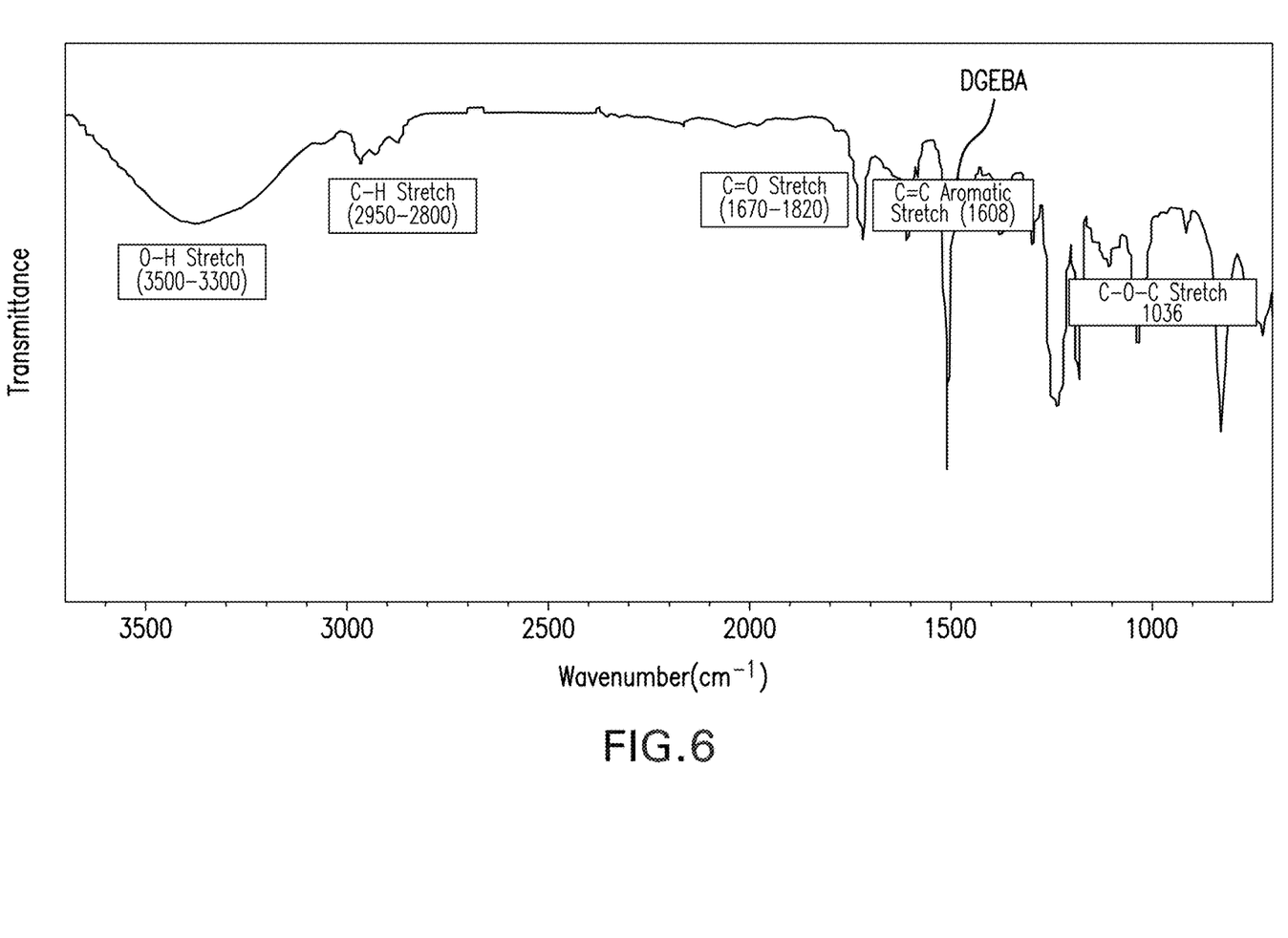
FIG. 6 shows results of a Fourier-transform infrared spectrum (FTIR) analysis of a bisphenol-A (DGEBA) epoxy cured with curing agent B.

FIGS. 5 and 6 are FTIR spectra of an example epoxy, in this case bisphenol-A (DGEBA) cured with agents A and B, respectively. The FTIR spectra of both FIGS. 5 and 6 reveal broad bands in the range of 3700 cm$^{-1}$ to 3300 cm$^{-1}$, which represent the hydroxyl group. N—H occurs near 3280 cm$^{-1}$, but is somewhat obscured by other signatures including the hydroxyl region and C—H stretch region: 2962-2874 cm$^{-1}$ for CH$_3$, CH$_2$, and CH. In both FIGS. 5 and 6 a sharp peak occurs at approximately 1720 cm$^{-1}$, which represents the signature of the carbonyl (C=O) functional group. Similarly, the characteristic peaks at 1608 cm$^{-1}$ and 1507 cm$^{-1}$ in both figures is due to the presence of the Ar—C=C—H chemical bond, which experiences stretching. Likewise, the peaks at 1240 cm$^{-1}$ and 1183 cm$^{-1}$ are associated with the presence of the —C—C—O—C— bond stretching. Absorption peaks for C—N— are evident in both FIGS. 5 and 6 at 1106 cm$^{-1}$. A —C—O—C— stretching peak is also found at 1035 cm$^{-1}$ in both figures. The peaks at 913 cm$^{-1}$ and 828 cm$^{-1}$ confirm the presence of the epoxy group. The FTIR spectra also indicate stretching of imide moieties including carbonyl symmetric stretching at 1780 cm$^{-1}$, imide-C—N at 1376 cm$^{-1}$, and C=O stretching, amide stretching —CONH— at 1607 cm$^{-1}$. In general, the curing of the DGEBA using curing agents A and B caused an increase in the absorption intensity of the hydroxyl characterized by broad spectral features, while the absorption intensity of the epoxide group at 913 cm$^{-1}$ decreased. The presence of OH— can be generally used for monitoring the curing process with time although its quantitative use is challenging due to the overlap with the stretching band of amines. However, the reaction mechanism of the curing process can be tracked using the variation of the epoxy concentration which will decrease with time while the —OH stretching band will increase during the curing process as a consequence of the oxirane ring opening.

observed in the spectra as the decrease of the band centered at ≈4530 cm−1 and also of the weak overtone of terminal CH2 at ≈6060 cm−1.

Figure 7:
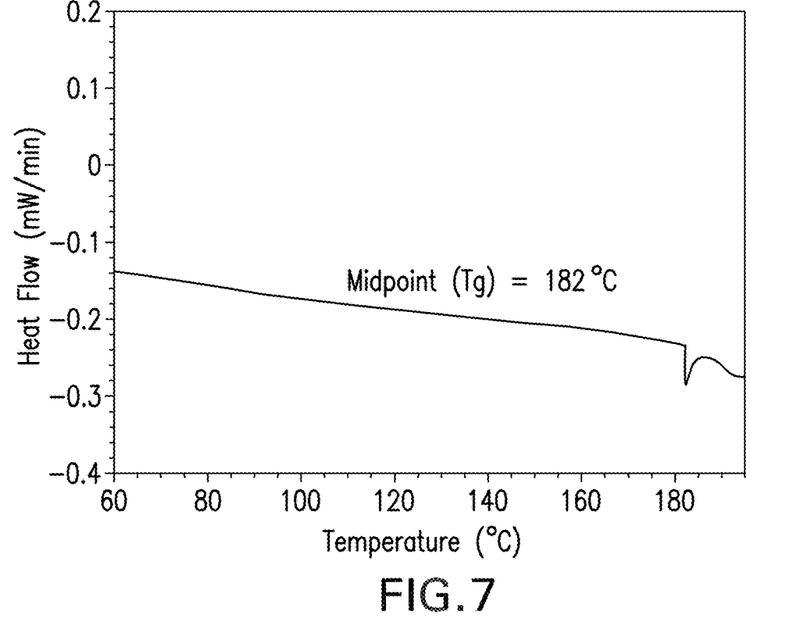
FIG. 7 is a graph of heat flow versus temperature taken from a differential heat scan (DSC) of the DGEBA-based epoxy cured with curing agent A.
Figure 8:
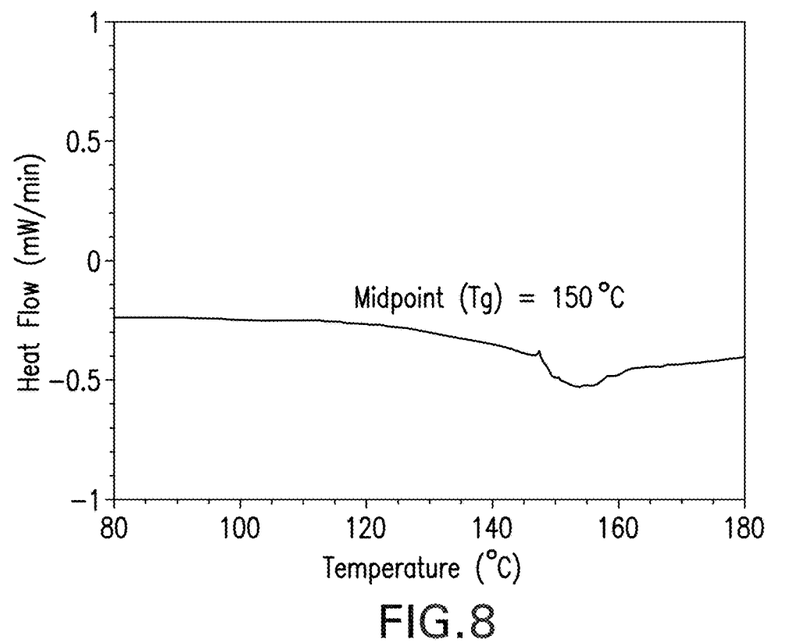
FIG. 8 is a graph of heat flow versus temperature taken from a differential heat scan (DSC) of the DGEBA-based epoxy cured with curing agent B.

FIG. 7 is a graph of heat flow versus temperature taken from a differential heat scan (DSC) of the DGEBA-based epoxy cured with curing agent A. FIG. 8 is a graph of heat flow versus temperature taken from a differential heat scan (DSC) of the DGEBA-based epoxy cured with curing agent B. The differential heat scan results depicted in FIGS. 7 and 8 were obtained with a differential scanning calorimeter (DSC) (DSC Q20 coupled with a Refrigerated Cooling System), following the method specified in the ASTM E1356 Standard published by ASTM International (see https://www.astm.org/Standards/E1356.htm). Differential scans were performed at a heating rate of 20° C./min in a temperature range from room temperature (RT) (° C.) to 200° C. under a nitrogen purge rate of 20 cm$^3$/min. Following cooling, the values reported were obtained from a second heating at a heating rate of 20° C./min. Differential heat scan calorimetry analysis was carried out for the two different fluorinated amine-epoxy resin systems using the same curing-agent-to-epoxy equivalent ratio of 1 to 4 (1:4).

The glass temperatures for the cured samples (T$_g$, the temperature at which an amorphous material transitions from a relatively hard or "glassy" state into a viscous or rubbery state) were taken as the midpoint of the sections of the graph that slope from the baseline. Thus, the glass transition temperature of the epoxy resin cured using curing agent A, shown in FIG. 7, is 182° C.; the glass transition temperature of the epoxy resin curing using curing agent B, shown in FIG. 8, is temperature to 150° C. The differing T$_g$ values of the epoxies cured using agents A and B demonstrate the dependence of the glass transition temperature on the nature and structure of the respective curing agents. It is known in the art that the glass transition temperature increases with a greater conversion of linear chains to cross-linked chains. This is an effect that is due primarily to the reduction of the quantity of polymers with low molecular weights (i.e., linear chains), and the decrease in the total number of free chain ends. The new branched structures are stronger due to the steric packing of the chains. Accordingly, the higher T$_g$ of the epoxy cured with agent A can indicates a higher degree of cross-linking in comparison to the epoxy cured with agent B.

As noted above, while the use of fluorinated additives can enhance the hydrophobicity of the epoxy coating, this technique usually leads to localized variations in the matrix properties because of the typically non-homogeneous concentration of the additives. The use of the curing agents according to the present invention eliminates the localized variation because the fluorinated moieties are an integral part of the curing agents and are therefore distributed homogeneously throughout the epoxy matrix. Since the curing agent is imide-based, it can also enhance both thermal stability and mechanical properties.

Figure 9:
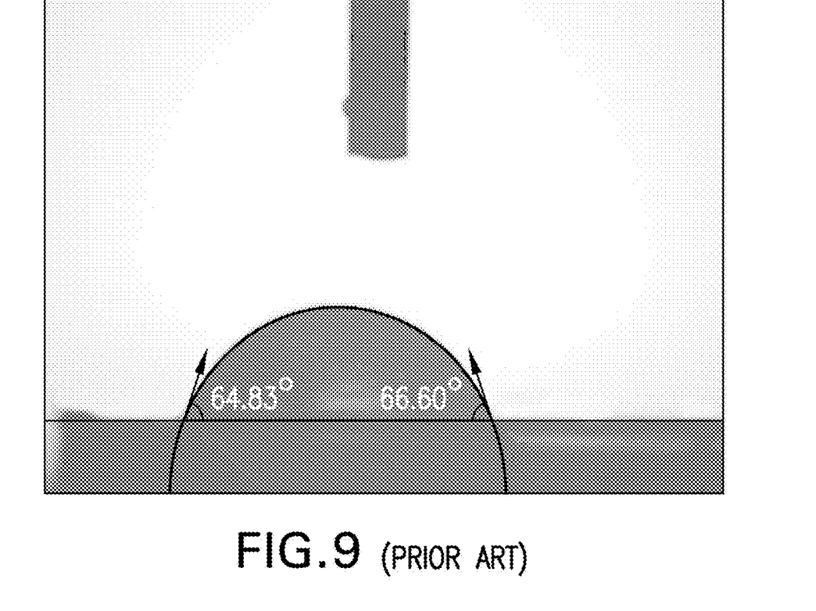
FIG. 9 shows an example Contact Angle measurement of an epoxy cured with IDPA (isphoronediamine) according to the prior art.
Figure 10:
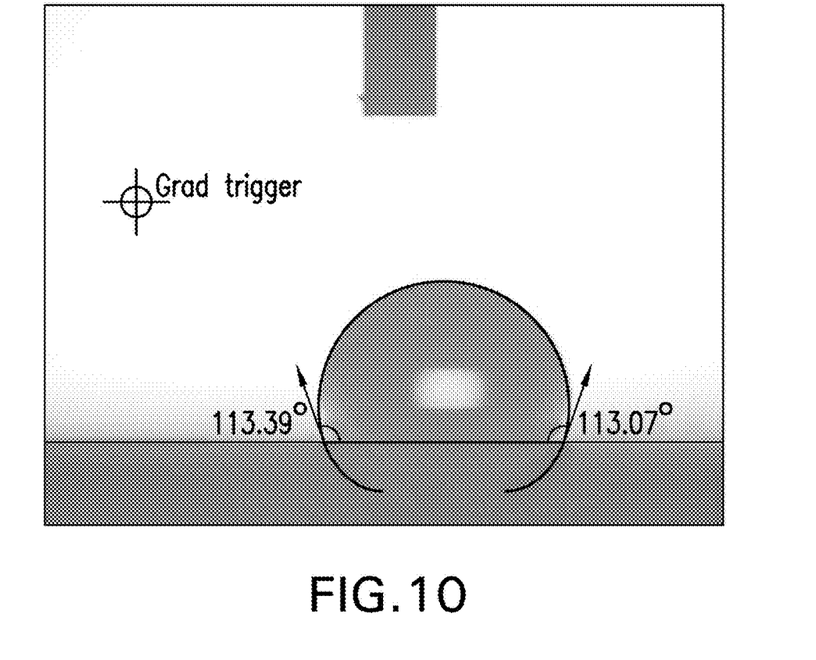
FIG. 10 shows an example Contact Angle measurement of an epoxy cured with curing agent A of the present invention.

The properties of the cured epoxies are modified and enhanced by the introduction of a desired functional group into the curing agent. The behavior of the functional group within the resulting matrix determines such modifications. One such property is the "Contact Angle" which measures the angle that a droplet of water makes on the epoxy matrix surface and thereby provides a measure of the hydrophobicity of the surface. The magnitude of the Contact Angle is proportional to the degree of hydrophobicity. An example Contact Angle measurement of an epoxy cured with IDPA (isphoronediamine) is shown in FIG. 9. FIG. 10 shows an example Contact Angle measurement of approximately 65 degrees for an epoxy cured with one of the curing agent A having 6FDA-fluorinated functional groups according to the present invention. The Contact Angle shown in FIG. 10, of approximately 113 degrees, is significantly increased in comparison to the Contact Angle shown in FIG. 9 and therefore shows a markedly improved hydrophobicity.

The enhanced hydrophobicity of the epoxy cured using agent A is added through the incorporation of fluorine-containing moieties in the core since they have the lowest surface energy of all chemical moieties and hence will introduce hydrophobicity, or water repellency, to the cured epoxy matrix. In addition, the amine functional groups at the terminating ends of the aromatic moieties form covalent bonds with the epoxy matrix through reaction between the amines and epoxy rings. The basicity of the curing agent can be adjusted to minimize curing process time and temperature. The heat resistance of the cured epoxy matrix is also enhanced by the inclusion of a structure having pendant amine moieties, such as the aromatic moieties of curing agents A and B of the present invention. Furthermore, as the fluorinated moieties and the bulky aromatic structure of the curing agents are added in the form of a cross-linker, the homogeneity of the moieties and structures in the cured epoxy matrix is increased greatly in comparison to using fluorinated additives.

In addition to curing epoxy, agents A and B can be used as monomers of building blocks in poly-condensation polymerization reactions. For example, agents and B can be used as reactants for polymerization of hydrophobic polyamide which can be used in the fabrication of membranes used in various separation processes.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A curing agent composition for curing an epoxy resin comprising:
    first and second imide-amine moieties which each include amine terminal functional groups, and
    a fluorinated central moiety covalently bonded to the first and second imide-amine moieties,
    wherein the amine functional groups of the curing agent, when applied to the epoxy resin, take part in curing reactions with ring molecules of the epoxy resin,
    wherein the curing agent has a molecular weight of less than 2000 grams per mole, and
    wherein the curing agent has the following formula:

2. A cured epoxy matrix comprising:
    an epoxy resin matrix; and
    a curing agent composition cross-linked with the epoxy resin, the curing agent including first and second imide-amine moieties which each include amine terminal functional groups and a fluorinated central moiety covalently bonded to the first and second imide-amine moieties, wherein the amine functional groups of the curing agent take part in curing reactions with ring molecules of the epoxy resin matrix,
    wherein the curing agent has the following formula:

3. The cured epoxy matrix of claim 2, wherein the curing agent is homogenously cross-linked with the epoxy resin throughout the matrix.

4. The cured epoxy matrix of claim 2, wherein the curing agent has a molecular weight of less than 2000 grams per mole.

5. A curing agent composition for curing an epoxy resin comprising:
    first and second imide-amine moieties which each include amine terminal functional groups, and a fluorinated central moiety covalently bonded to the first and second imide-amine moieties,
wherein the amine functional groups of the curing agent, when applied to the epoxy resin, take part in curing reactions with ring molecules of the epoxy resin,
wherein the curing agent has a molecular weight of less than 2000 grams per mole, and
wherein the curing agent has the following formula:

6. A cured epoxy matrix comprising:
an epoxy resin matrix; and
a curing agent composition cross-linked with the epoxy resin, the curing agent including first and second imide-amine moieties which each include amine terminal functional groups and a fluorinated central moiety covalently bonded to the first and second imide-amine moieties, wherein the amine functional groups of the curing agent take part in curing reactions with ring molecules of the epoxy resin matrix,
wherein the curing agent has the following formula:

7. The cured epoxy matrix of claim 6, wherein the curing agent is homogenously cross-linked with the epoxy resin throughout the matrix.

\* \* \* \* \*